US 6,690,937 B1

(12) United States Patent
Pfeiffer

(10) Patent No.: US 6,690,937 B1
(45) Date of Patent: Feb. 10, 2004

(54) RADIO NETWORK SYSTEM

(76) Inventor: Jeffrey C. Pfeiffer, 6350 Bills Rd., Naples, NY (US) 14512

( * ) Notice: Subject to any disclaimer, the term of this patent is extended or adjusted under 35 U.S.C. 154(b) by 20 days.

(21) Appl. No.: 09/715,512

(22) Filed: Nov. 17, 2000

(51) Int. Cl.$^7$ .............................. H04Q 7/20; H04B 1/38
(52) U.S. Cl. ........................ 455/445; 455/524; 455/561
(58) Field of Search ................................. 455/403, 426, 455/445, 524, 561, 456, 560, 562

(56) References Cited

U.S. PATENT DOCUMENTS

| | | | | |
|---|---|---|---|---|
| 5,293,645 A | * | 3/1994 | Sood | 455/456 |
| 5,303,287 A | * | 4/1994 | Laborde | 455/426 |
| 5,315,636 A | | 5/1994 | Patel | |
| 5,337,344 A | * | 8/1994 | Alvesalo | 455/403 |
| 5,353,331 A | | 10/1994 | Emery et al. | |
| 5,402,470 A | * | 3/1995 | DeVaney | 455/561 |
| 5,490,203 A | | 2/1996 | Jain et al. | |
| 5,706,331 A | | 1/1998 | Wang et al. | |
| 5,799,252 A | * | 8/1998 | Nakagoshi et al. | 455/524 |
| 5,805,997 A | | 9/1998 | Farris | |
| 5,999,813 A | * | 12/1999 | Lu et al. | 455/445 |
| 6,014,377 A | | 1/2000 | Gillespie | |

* cited by examiner

*Primary Examiner*—Quochien Vuong
(74) *Attorney, Agent, or Firm*—Phillips, Lytle, Hitchcock, Blaine & Huber LLP

(57) ABSTRACT

The invention is directed to an improved two-way radio network system (15). In the preferred embodiment, the system comprises a radio (16), a first tower (17) having a defined first coverage area (23) and capable of communicating with the radio when the radio is in the first coverage area, a second tower (18) communicating with the first tower and having a defined second coverage area (24) and capable of communicating with the radio when the radio is in the second coverage area, a local hub (53) communicating with the first tower and the second tower, the first tower, second tower, and local hub so configured and arranged that a signal from the radio when the radio is in the first coverage area may be received by the first tower and communicated either to the second tower or to the local hub and communicated from the local hub to the second tower, whereby the communication capacity of the system may be increased.

The communication network system may include a third tower (29) having a defined third coverage area (35) capable of communicating with the radio when the radio is in the third coverage area, a second local hub (54) communicating with the third tower, a first regional hub (56) communicating with the first local hub and the second local hub, the first regional hub, the first local hub and the second local hub so configured and arranged that a signal received by the second local hub may be communicated to the first regional hub and communicated from the first regional hub to the first local hub.

The communication network system may include a second regional hub (58), a first district hub (62) communicating with the first regional hub and the second regional hub, the first regional hub, second regional hub, and first district hub so configured arranged that a signal received by the first regional hub may be communicated to the first district hub and communicated from the first district hub to the second regional hub.

24 Claims, 6 Drawing Sheets

RADIO NETWORK SYSTEM

TECHNICAL FIELD

The present invention relates generally to the field of radio networks and, more particularly, to an improved two-way radio network system.

BACKGROUND ART

Mobile radio communication systems are used extensively in the U.S. to provide communication between fleet operators whose vehicles travel regularly on a regional basis. Typically, these types of systems are used by fire departments, emergency medical services, police and police dispatch systems, schools, government agencies, and 911 control centers. In addition, such systems are used by manufacturing plants for maintenance coordination, security, and safety, as well as by service operators, where dispatching and internal organizational communication are needed between and among field operators and control bases.

Two-way systems used in the prior art, however, are limited in range, roaming capability, and capacity. In the prior art, such two-way radio systems consist of a series of towers, each of which has a certain coverage area. The towers are linked in geographic series. Thus, to connect between a radio in one coverage area and a radio in an alternate coverage area, the signal had to be sent to the receiving tower, and then routed serially to the sending tower, where it is broadcast to the receiving radio. However, linking the towers in series results in a great deal of inefficiency, which reduces the capacity of the system to handle numerous radio signals.

Accordingly, it would be beneficial to have a two-way radio system which allowed for interconnections between towers in an efficient manner and one which optimizes the capacity of the system to handle numerous signals.

DISCLOSURE OF THE INVENTION

With parenthetical reference to the corresponding parts, portions or surfaces of the disclosed embodiment, merely for the purposes of illustration and not by way of limitation, the present invention provides an improved two-way radio network system (15) comprising a radio (16), a first tower (17) having a defined first coverage area (23) and capable of communicating with the radio when the radio is in the first coverage area, a second tower (18) communicating with the first tower and having a defined second coverage area (24) and capable of communicating with the radio when the radio is in the second coverage area, a local hub (53) communicating with the first tower and the second tower, the first tower, second tower, and local hub so configured and arranged that a signal from the radio when the radio is in the first coverage area may be received by the first tower and communicated either to the second tower or to the local hub and communicated from the local hub to the second tower, whereby the communication capacity of the system may be increased.

The communication network system may have a third tower (29) having a third coverage area (35) and capable of communicating with the radio when the radio is in the third coverage area, a second local hub (54) communicating with the third tower and the first local hub, the third tower, first local hub and second local hub so configured and arranged that a signal from the radio when the radio is in the third coverage area may be received by the third tower and communicated to the second local hub and communicated from the second local hub to the first local hub.

The communication network system may include a third tower (29) having a defined third coverage area (35) capable of communicating with the radio when the radio is in the third coverage area, a second local hub (54) communicating with the third tower, a first regional hub (56) communicating with the first local hub and the second local hub, the first regional hub, the first local hub and the second local hub so configured and arranged that a signal received by the second local hub may be communicated to the first regional hub and communicated from the first regional hub to the first local hub.

The communication network system may include a second regional hub (58), a first district hub (62) communicating with the first regional hub and the second regional hub, the first regional hub, second regional hub, and first district hub so configured arranged that a signal received by the first regional hub may be communicated to the first district hub and communicated from the first district hub to the second regional hub.

The first tower and the second tower may communicate by a T-1 connection, the first tower and the first local hub may communicate by a T-1 connection, the first local hub and the first regional hub may communicate by a T-1 connection. The T-1 connection may be a microwave connection, a fiber-optic connection, or a copper wire connection. The first tower may include an antenna (64), an antenna feed line (68), an antenna combiner system (73), a polyphasor (70), and/or a base station (74). The base station may transmit and receive at a YG licensed frequency. The first tower may include a site controller (81) and/or a T-1 level switcher (82). The local hub may include a T-1 router (83) and/or a microwave radio. The first regional hub may include a T-1 router (84) and/or a microwave radio.

DESCRIPTION OF THE PREFERRED EMBODIMENTS

Figure 1:
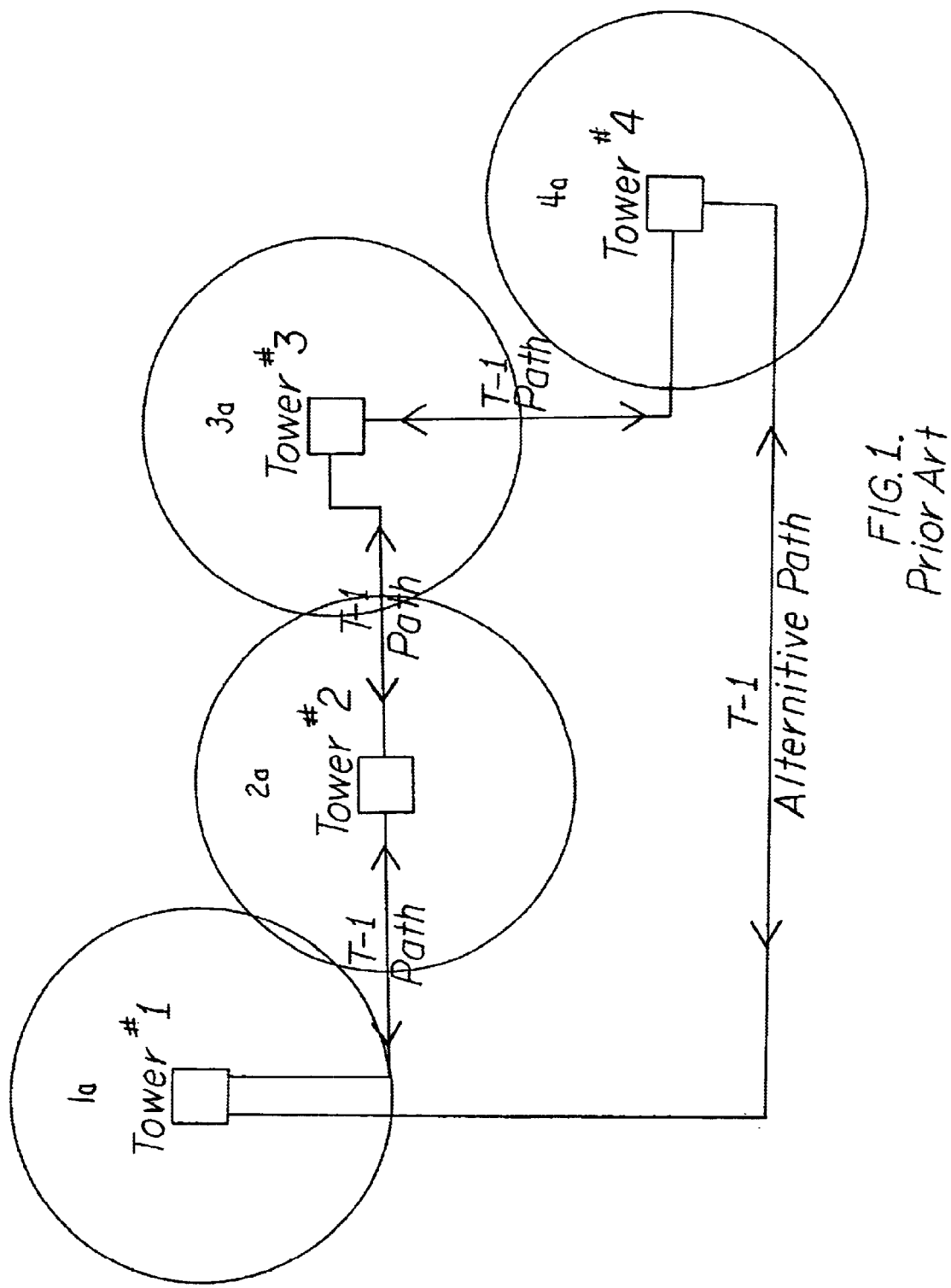
FIG. 1 is a schematic of the two-way radio network system known in the prior art.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g.,"horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 shows a two-way radio network system known in the prior art. As shown in FIG. 1, such a system includes a series of towers, each tower having a certain coverage area in which the tower can receive signals from a mobile radio or transmit signals to a mobile radio. As shown, tower 1 has a coverage area 1a, tower 2 has a coverage area 2a, tower 3 has a coverage area 3a, and tower 4 has a coverage area 4a.

Each of towers 1–4 are connected to two other towers in series. Thus, for a radio signal to be received from coverage area 1a and transmitted to a radio in coverage area 4a, the signal must be received by tower 1, transferred to tower 2, transferred from tower 2 to tower 3, transferred from tower 3 to tower 4, and then transmitted from tower 4 to the receiving radio in coverage area 4a, or, alternatively, the signal must be received by tower 1 and transmitted directly to tower 4 through the alternative path indicated.

This system or configuration has a number of disadvantages. First, it results in a great deal of inefficiency because of the requirement that the signal be transferred in series from tower to tower. As the desired coverage area, and therefore the number of towers increase, the traffic through each tower also increase as signals are transferred from various coverage areas through the system. This type of system can result in limited capacity and coverage.

Figure 2:
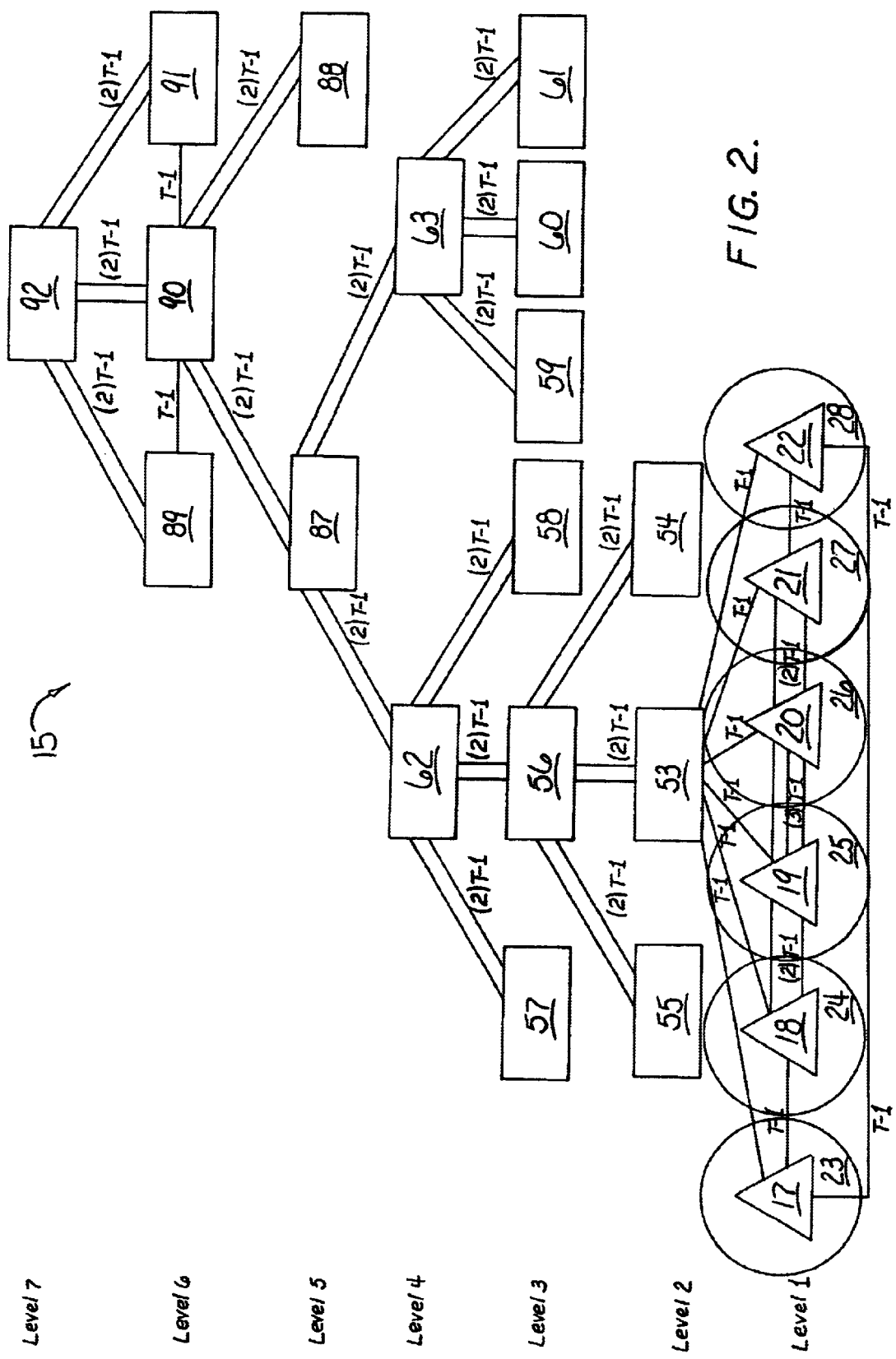
FIG. 2 is a partial schematic of the improved communication network system.

Referring now to FIG. 2, this invention provides an improved radio network system, of which the presently preferred embodiment is generally indicated at 15. As shown in FIG. 2, the improved communications network system is set up in the form of a pyramid. At the bottom of the pyramid (level 1) are numerous towers, each of which has a given coverage area. Each tower can receive and transmit a signal to a radio within its respective coverage area. In the preferred embodiment, the towers are arranged in groups of six.

Figure 3:
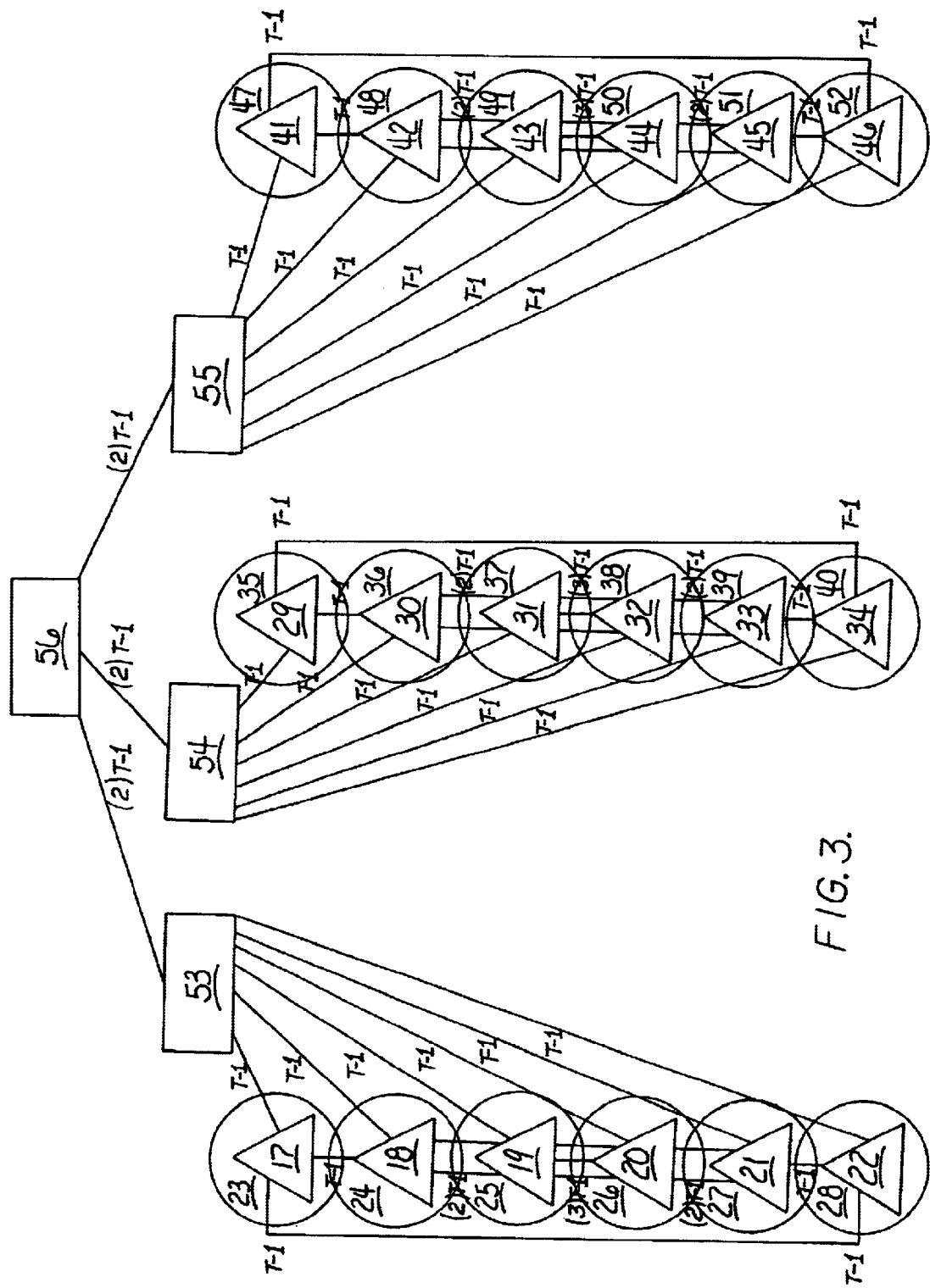
FIG. 3 is a detailed schematic of a regional hub shown in FIG. 2.
Figure 4:
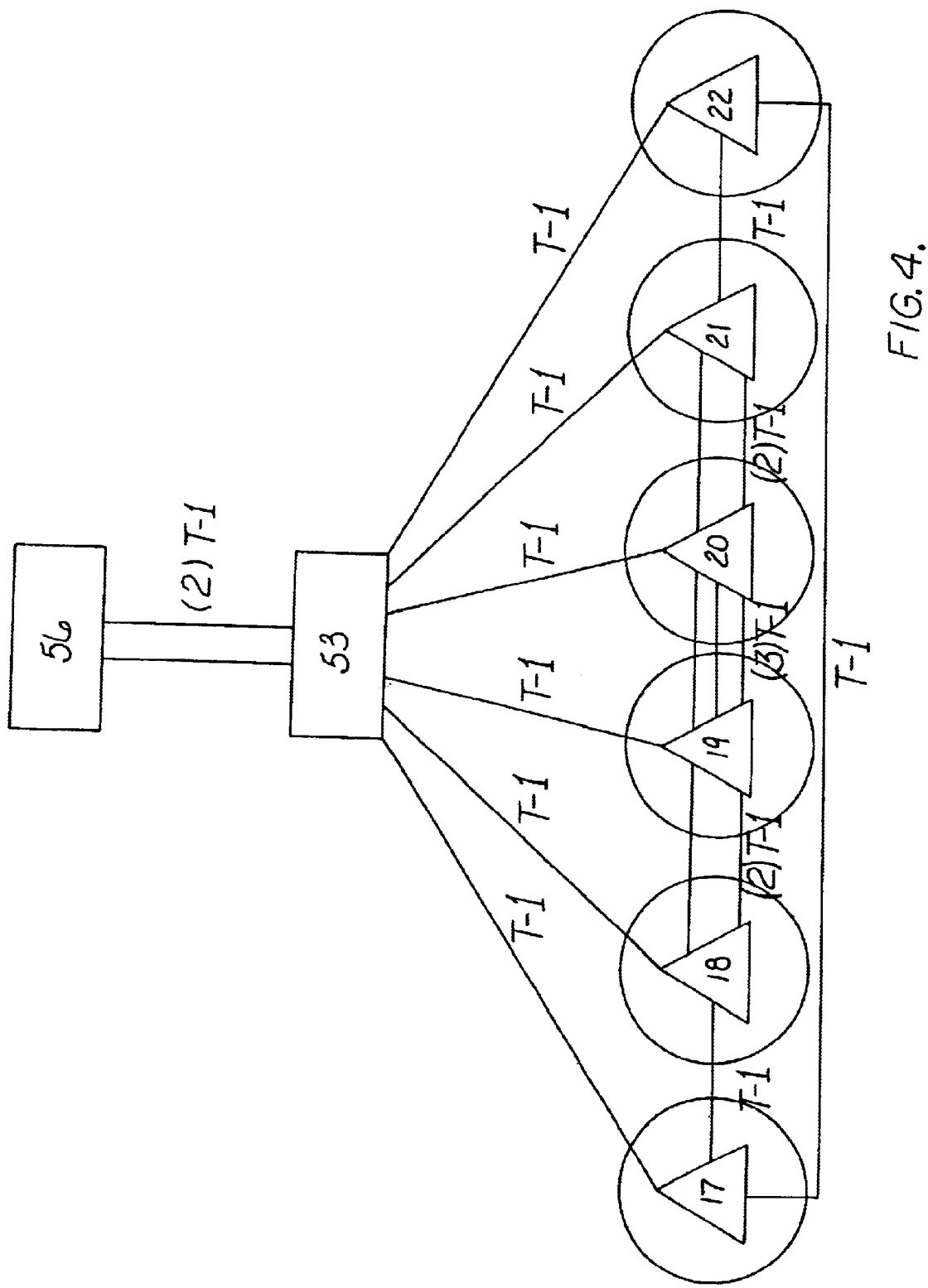
FIG. 4 is a detailed schematic of the a local hub shown in FIG. 3.
Figure 6:
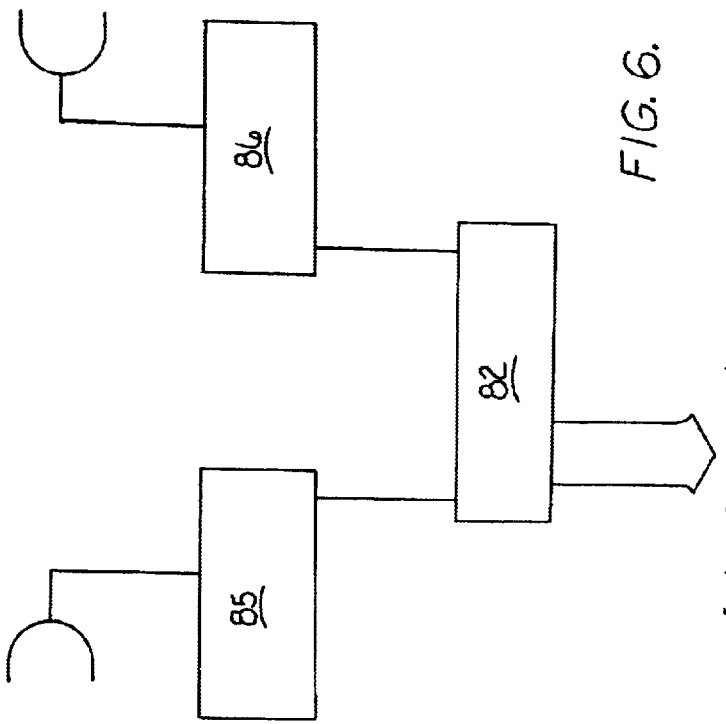
FIG. 6 is a schematic of the routing for a tower shown in FIG. 4.

As shown in FIGS. 2–3, each tower in the group of six communicates with a local hub (level 2). Thus, for every six towers, there is one local hub.

As shown in FIG. 2, the local hubs are, in turn, arranged in groups of three, with each hub in the group of three communicating with a single regional hub (level 3). The regional hubs are arranged in groups of three and, in turn, each communicates with a district hub (level 4). Each of the two district hubs communicates with an area hub (level 5), each of the three area hubs communicates with a state hub (level 6), and each of the three state hubs communicate with an interstate hub (level 7). In the preferred embodiment, the hubs are not remotely located, but are positioned at one of the towers.

As shown in FIG. 2, the towers are at the most local level, the local hubs are at level 2, the regional hubs are at level 3, the district hubs are at level 4, the area hubs are at level 5, the state hubs are at level 6, and the interstate hub is at level 7. Additional levels may be added depending on the geographic area to be covered. In addition, while the preferred embodiment has six individual towers communicating with one local hub, and three local hubs communicating with one regional hub, and three regional hubs communicating with one district hub etc., the number of towers, local hubs, and regional hubs communicating between each level may be readily varied.

FIG. 3 shows the system extending down from regional hub 56 in FIG. 2. As shown in FIG. 3, regional hub 56 communicates directly with local hubs 53, 54, and 55. Each of hubs 53, 54, and 55, communicate, in turn, with six towers. Local hub 53 communicates with towers 17–22, local hub 54 communicates with towers 29–34, and local hub 55 communicates with towers 41–46. Each of towers 17–22, 29–34 and 41–46 have coverage areas 23–28, 35–40, and 47–52, respectively.

As shown in FIG. 3, towers 17–22 communicate indirectly between themselves. In addition, towers 17–22 each directly communicate with local hub 53. Thus, tower 17 communicates directly with tower 18 and tower 22, tower 18 communicates directly with tower 17 and tower 19, tower 19 communicates directly with tower 18 and tower 20, tower 20 communicates directly with tower 19 and tower 21, tower 21 communicates directly with tower 20 and tower 22, and tower 22 communicates directly with tower 21 and tower 17.

Towers 17–22 communicate with each other by a conventional T-1 connection. However, the number of T-1 connections between towers 17–22 vary. The connection between tower 17 and tower 18, between tower 17 and 22, and between tower 21 and 22 are single T-1 connections. However, towers 18 and 19 communicate by two T-1 connections. Towers 19 and 20 communicate by three T-1 connections. Towers 20 and 21 communicate by two T-1 connections. The use of multiple T-1 connections between certain of the towers increases the capacity and efficiency of the system. In the preferred embodiment, each of towers 17–22 communicate with local hub 53 through single T-1 connections. However, the size of the communication paths between towers and between towers and hubs may vary based on desired redundancy and traffic flow patterns.

As shown in FIG. 3, towers 29–34 and local hub 54 are arranged in a similar configuration. Tower 29 communicates directly with tower 30 and tower 34 by a single T-1 connection. Tower 30 communicates directly with tower 31 by two T-1 connections. Tower 31 communicates directly with tower 32 by three T-1 connections. Tower 32 communicates directly with tower 33 by two T-1 connections. Tower 33 communicates directly with tower 34 by a single T-1 connection. Each of towers 29–34 communicate directly with local hub 54 by single T-1 connections. As shown in FIG. 3, towers 41–46 and local hub 55 communicate in the same manner as above.

As shown in FIGS. 2–3, each of local hubs 53–55 communicate with regional hub 56. Local hub 55 communicates with regional hub 56 by two T-1 connections, local hub 54 communicates with regional hub 56 by two T-1 connections, and local hub 53 communicates with regional hub 56 by two T-1 connections. In an alternate embodiment (not shown), local hubs 53, 54, and 55 also communicate with each other by one or more T-1 connections.

As shown in FIG. 2, regional hub 56 communicates with district hub 62 by two T-1 connections. In addition, regional hub 57 and regional hub 58 communicate with district hub 62 by two T-1 connections, respectively.

Regional hub 57 has three local hubs (not shown) branching from it, and six towers (not shown) branching from each of such local hubs. Similarly, local hubs 58, 59, 60, and 61 each have three local hubs (not shown) branching from each of them, and six towers (not shown) branching from each of such local hubs. Thus, district hub 62 is in communication, through its three regional hubs 56–58 and nine local hubs, with fifty-four individual towers. Similarly, district hub 63 is in communication, through its three regional hubs 59–61 and nine local hubs, with fifty-four towers.

Figure 5:
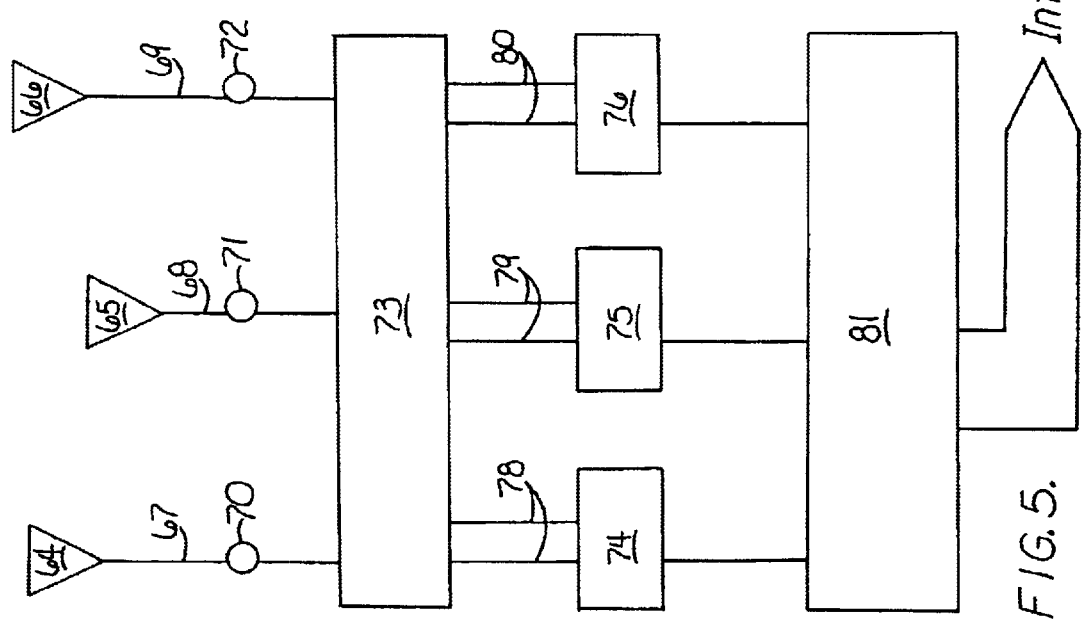
FIG. 5 is a schematic of a tower shown in FIG. 4.

Towers 17–22, 29–34, and 41–46, in the preferred embodiment, are designed to transmit at and receive at various frequencies. As shown in FIG. 5, in the preferred embodiment, each tower includes three antennas 64–66. Antennas 64, 65 and 66 allow transmission of a signal to mobile radios in the coverage area of the tower. Antennas 64–66 are mounted on a communication tower. Signals are relayed to and from a base station below the tower through antenna feedlines 67–69. While the preferred embodiment employs three antennas, the total number of antennas utilized may vary depending on the number of frequency bands used at each site as well as the separation of each individual channel frequency within each frequency band. Also, the type of antenna may vary depending on the desired coverage area and the licensed effective radiated power. The Sinclair Radio Labs SRL-222 transmitting antenna manufactured by Sinclair Technologies of 55 Oriskany Drive, Tonawanda, N.Y. 14150 may be employed in the preferred embodiment.

Antennas 64–66 transmit from each communication tower and are connected to antenna combiner system 73 by antenna feedlines 67, 68, and 69, respectively. Antenna feedlines 67–69 simply transmit the signal between the antennas and the site equipment at the communication tower. The specific specification of the antenna feedlines 67–69 may be varied depending on the type of antenna and frequency used. The Andrews LDF-50A antenna feedlines manufactured by Andrews Corporation of 10500 West 153rd Street, Orland Park, Ill. 60462 may be employed in the preferred embodiment.

Polyphasors 70–72 are employed to provide lightning protection to the equipment used in the tower. The polyphasor IS-VU50HN polyphasor manufactured by Polyphasor Corporation of 2225 Park Place, Minden, Nev. 89423 may be employed in the preferred embodiment.

As shown in FIG. 5, a conventional antenna combiner system 73 is used to allow for multiple channels or frequencies to be broadcast from one antenna. Antenna combiner system 73 sorts the signals received from one antenna and prevents interference between transmitting and receiving frequencies through one antenna. Antenna combiner system 73 splits and directs the signal to proper base stations 73–76 and combines the signal from each base station 74–76. Antenna combiner system 73 includes a transmitter combiner and receiver multi-couplers. In the preferred embodiment, each transmit channel employs a dual isolator on each channel and provides proper isolation between all transmit frequencies and receive frequencies at the site, including appropriate harmonics. The Sinclair YB-09552-01 antenna combiner system manufactured by Sinclair Technologies of 55 Oriskany Drive, Tonawanda, N.Y. 14150 may be employed in the preferred embodiment.

Base station 74–76 are of varies types. Base station 74 is provided for voice or data channels and, in the preferred embodiment, is licensed as a "YG" exclusive use engineered frequency, to be transmitted at will. The frequency used is licensed such that the FCC does not require monitoring before the transmission occurs. Base station 74 is utilized as a trunking home channel or a control channel, which provides the hand-shaking function between the tower and mobile radio. It is contemplated that the power output of station 74 may vary, as may the design based on FCC Licensed ERP, combiner loss, feedline loss and antenna gain. The Kenwood TKR-720 base station manufactured by Kenwood USA Corporation of 2201 East Domingvez Street, Long Beach, Calif. 90801-5745 may be employed in the preferred embodiment.

In the preferred embodiment, base station 75 is a licensed "IG" voice only shared use frequency. Thus, the control system is capable of electronic or manual monitoring functions prior to transmissions, as well as having a capability to perform level two monitoring functions. Base station 75 may be utilized as a conventional stand alone channel or a trunking go to and/or voice channel. It is contemplated that the power output may vary as may the design based on FCC Licensed ERP, combiner loss, feedline loss and antenna gain. The Kenwood TKR-720 base station manufactured by Kenwood USA Corporation of 2201 East Domingvez Street, Long Beach, Calif. 90801-5745 may be employed in the preferred embodiment.

In the preferred embodiment, base station 76 is a "YG" licensed base station. However, it is contemplated that a "IG" channel with proper monitoring circuitry may also be employed. Primary voice communications and data communications are secondary on this channel. Base station 76 employs a direct FM modulated transmitter with a minimum of two internal modems. Thus, data signals, such as global positioning and/or e-mail may be run through base station 76. It is contemplated that the power output may vary as well as the design based on FCC Licensed ERP, combiner loss, feedline loss, and antenna gain. The Kenwood TKR-720M base station manufactured by Kenwood USA Corporation of 2201 East Domingvez Street, Long Beach, Calif. 90801-5745 may be employed in the preferred embodiment.

Site controller 81 provides the local processing functions for system 15. In effect, it controls the functioning of the base stations, determines the operating format and protocol of each channel, and provides repeater, trunking and channel sharing functions.

Site controller 81 identifies when a identified mobile radio is in a receiving area of the tower, and determines how to connect through the system to the receiving or transmitting mobile radio. For example, if a signal is received at tower 17 as keyed for transmission to a mobile unit in coverage area 51 of tower 45, site controller 81 determines whether the signal should travel directly to local hub 53, from local hub 53 to regional hub 56, from regional hub 56 to local hub 55, and from local hub 55 to tower 45 for transmission to the receiving mobile radio, or, alternatively, from tower 17 to tower 22, from tower 22 to local hub 53, from local hub 53 to regional hub 56, from regional hub 56 to local hub 55, from local hub 55 to tower 46, and from tower 46 to tower 45 for transmission to the receiving mobile radio in coverage area 51. Thus, alternate routes may be used in the system depending on the volume of traffic through varies legs of the system.

Site controller 81 includes a chassis, master card, two clock modules, three T-1 cards, and at least one dual channel card. Chassis 700-604, master card 700-603, clock module 700-605, T-1 card 700-606, and dual channel card 700-601, manufactured by Trident Micro Systems, a division of Trident Datacom Technologies, Inc., of Two Trident Drive, Arden, N.C. 28704 may be employed in the preferred embodiment.

Site controller 81 interfaces with T-1 level switcher/router 82. The interface between the site controller 81 and router 82 is through T-1 compression circuitry.

Router 82 is a T-1 level switcher/MUX/router which provides integrated T-1 CSU functionality and utilizes generic SNMP management to determine the most efficient route for transferring the signal through the system to an alternate transmitting tower. The OMNIBranch router manufactured by Bayly Communications, Inc. of 105 Green Crt., Ajax, Ontario, Canada LTS 6W9 may be employed in the preferred embodiment. By determining the most efficient route through the system for transferring the signal, router 82 provides built-in redundancy in the system in an event of breakdowns or excessive traffic through certain legs of the system.

The communicated signal is transmitted through either microwave TX/RX unit 85 or microwave TX/RX unit 86. It is contemplated that either or both units 85 or 86 may transmit by T-1 connection through fiber or copper rather than microwave. The band width of units 85 and 86 is determined by the total system capacity required. Units 85 and 86 include battery rack and rectifier units. While licensed spectrum is preferred, proper capacity unlicensed units may be employed in the alternative. The Granger gt-Series microwave TX/RX unit manufactured by Granger Telecom of 1219 Safari, San Antonio, Tex. 78216 may be employed in the preferred embodiment.

Each local hub employs routing software designed for the dispatch market. In the preferred embodiment, it directly controls the six connected site controllers and routes a signal between the six directly connected site controllers and regional hub. Each local hub includes a chassis with a master card, two clock modules and four dual T-1 cards. In the preferred embodiment, the Trident 700-604 chassis, 700-603 master card, 700-605 clock module, and 700-606T-1 card, manufactured by Trident Micro Systems, a division of Trident Datacom Technologies, Inc., of Two Trident Drive, Arden, N.C. 28704, may be employed in the preferred embodiment.

Figure 7:
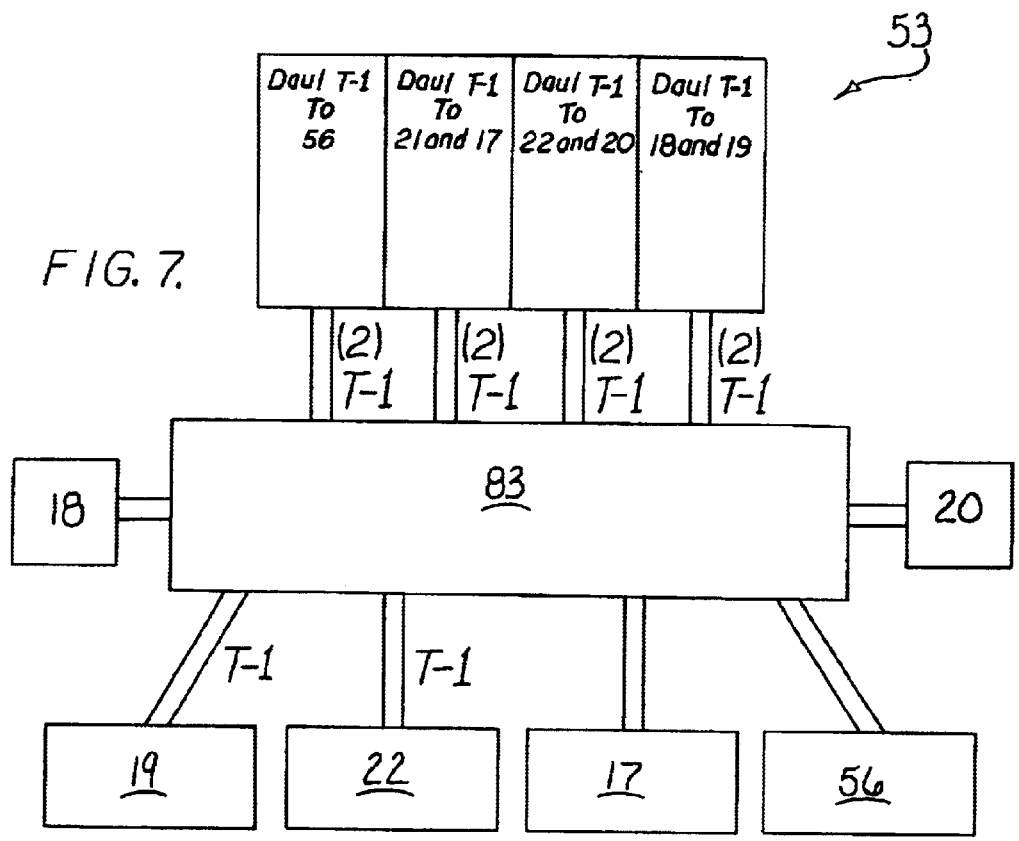
FIG. 7 is a schematic of the routing for the local hub shown in FIG. 4.

Each local hub includes a T-1 switcher/router 83, which combines the T-1 circuits from the local hub and site controllers and routes them to the appropriate microwave radio. Router 83 includes automatic protection and audio rerouting in the event of a network failure and includes an embedded SNMP agent for control and management. Router 83 increases efficiency by consolidating traffic and saving on the signal resources. As shown in FIG. 7, router 83 at local hub 53 is designed to route signals to each of towers 17, 18, 19, 20, 21 and 22, as well as to regional hub 56 by T-1 connections employing a microwave or copper conveyance.

Figure 8:
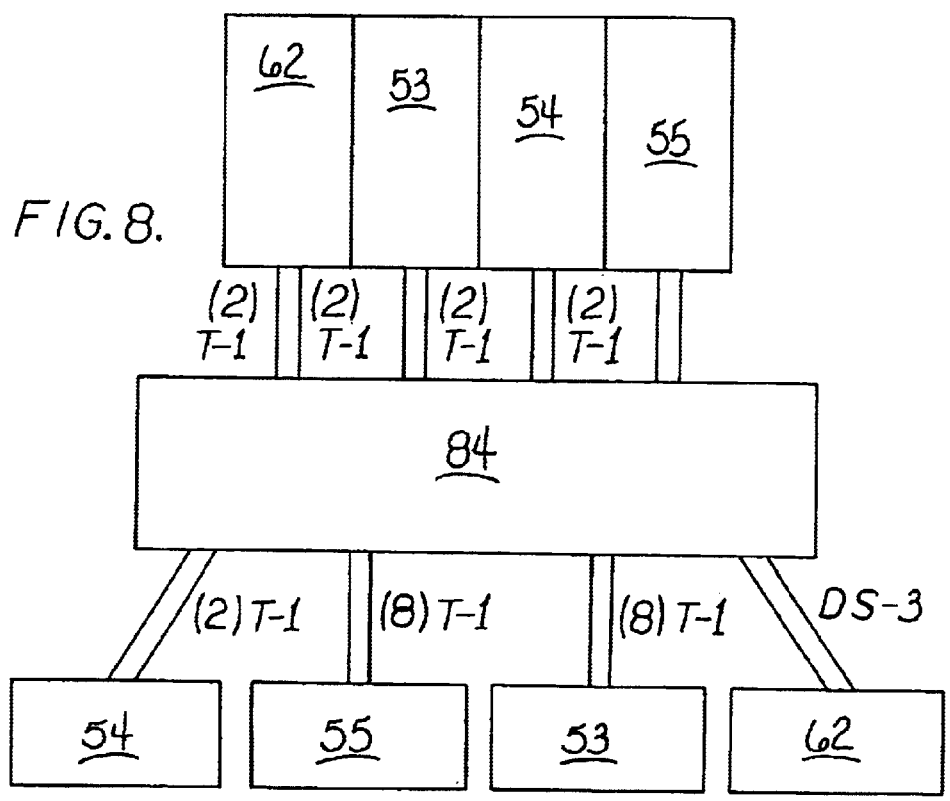
FIG. 8 is a schematic of the routing for the regional hub shown in FIG. 3.

As shown in FIG. 8, regional hub 56 includes a T-1 switcher/router 84, which routes signals between district hub 62, local hub 53, local hub 54, and local hub 55 by T-1 to DS-3 connections employing microwave, copper or fiber optic conveyance.

The present invention contemplates that many changes and modifications may be made. Therefore, while the presently-preferred form of the radio network system has been shown and described, persons skilled in the art will readily appreciate that various additional changes and modifications may be made without departing from the spirit of the invention, as defined and differentiated by the following claims.

What is claimed is:

1. A communication network system comprising:
    at least two two-way radios;
    at least one source radio;
    a first tower having a defined first coverage area and capable of communicating with said source radio when said source radio is in said first coverage area;
    a second tower having a defined second coverage area and capable of communicating with said two-way radios when said radios are in said second coverage area;
    a local hub communicating with said first tower and said second tower;
    said first tower, said second tower, and said local hub so configured and arranged that a signal from said source radio when said source radio is in said first coverage area may be received by said first tower and communicated to said local hub, communicated from said local hub to said second tower, and communicated from said second tower to at least two of said two-way radios at substantially the same time when said radios are in said second coverage area.

2. The communication network system set forth in claim 1, and further comprising:
    a third tower having a defined third coverage area and capable of communicating with said two-way radio when said radio is in said third coverage area;
    a second local hub communicating with said third tower and said first local hub;
    said third tower, said first local hub, and said second local hub so configured and arranged that a signal from said source radio when said source radio is in said first coverage area may be received by said first tower and communicated to said first local hub, communicated from said first local hub to said second local hub, and communicated from said second local hub through said first and/or second towers to at least two of said two-way radios at substantially the same time when said radios are in said first and/or second coverage areas respectively.

3. The communication network system set forth in claim 1, and further comprising:
    a third tower having a defined third coverage area and capable of communicating with said two-way radio when said radio is in said third coverage area;
    a second local hub communicating with said third tower;
    a first regional hub communicating with said first local hub and said second local hub;
    said first regional hub, said first local hub, and said second local hub so configured and arranged that a signal received by said first local hub may be communicated to said first regional hub and communicated from said first regional hub to said second local hub.

4. The communication network system set forth in claim 3 and further comprising:
    a second regional hub;
    a first district hub communicating with said first regional hub and said second regional hub;
    said first regional hub, said second regional hub, and said first district hub so configured and arranged that a signal received by said first regional hub may be communicated to said first district hub and communicated from said first district hub to said second regional hub.

5. The communication network system set forth in claim 4, and further comprising:
    a third regional hub;
    said first district hub communicating with said third regional hub;
    said first regional hub, second regional hub, third regional hub, and said first district hub so configured and arranged that a signal received by said first regional hub may be communicated to said first district hub and communicated from said first district hub to said second and third regional hubs at substantially the same time.

6. The communication network system set forth in claim 3, wherein said first local hub and said first regional hub communicate by a T-1 connection.

7. The communication network system set forth in claim 3, wherein said first regional hub includes a T-1 router.

8. The communication network system set forth in claim 3, wherein said first regional hub includes a microwave radio.

9. The communication network system set forth in claim 3, and further comprising:

a fourth tower having a defined fourth coverage area and capable of communicating with said two-way radio when said radio is in said fourth coverage area;

a third local hub communicating with said fourth tower;

said first regional hub communicating with said third local hub;

said first regional hub, said first local hub, said second local hub, and said third local hub so configured and arranged that a signal received by said first local hub may be communicated to said first regional hub and communicated from said first regional hub to said second local hub and said third local hub at substantially the same time.

10. The communication network system set forth in claim 1, wherein said first tower and said second tower communicate by a T-1 connection.

11. The communication network system set forth in claim 10, wherein said T-1 connection is a microwave connection.

12. The communication network system set forth in claim 11, wherein said local hub includes a microwave radio.

13. The communication network system set forth in claim 10, wherein said T-1 connection is a fiber-optic connection.

14. The communication network system set forth in claim 10, wherein said T-1 connection is a copper wire connection.

15. The communication network system set forth in claim 1, wherein said first tower and said local hub communicate by a T-1 connection.

16. The communication network system set forth in claim 1, wherein said first tower includes an antenna and an antenna feedline.

17. The communication network system set forth in claim 16, wherein said first tower includes an antenna combiner system.

18. The communication network system set forth in claim 16, wherein said first tower includes a polyphasor.

19. The communication network system set forth in claim 1, wherein said first tower includes a base station.

20. The communication network system set forth in claim 19, wherein said base station transmits and receives at a YG licensed frequency.

21. The communication network system set forth in claim 1, wherein said first tower includes a site controller.

22. The communication network system set forth in claim 1, wherein said first tower includes a T-1 level switcher.

23. The communication network system set forth in claim 1, wherein said local hub includes a T-1 router.

24. The communication network system set forth in claim 1, and further comprising:

a third tower communicating with said local hub and having a defined third coverage area and capable of communicating with said two-way radio when said radio is in said third coverage area;

said first tower, said second tower, said third tower and said local hub so configured and arranged that a signal from said source radio when said source radio is in said first coverage area may be received by said first tower and communicated to said local hub, communicated from said local hub to both said second tower and said third tower at substantially the same time, and communicated from said second tower to at least one of said two-way radios when said radio is in said second coverage area and at substantially the same time communicated from said third tower to at least one of said two-way radios when said radio is in said third coverage area.

* * * * *